Patented Mar. 1, 1938

2,109,634

UNITED STATES PATENT OFFICE 2,109,634

CATHODE FOR FOIL FILMING

George W. Elsey, Dayton, Ohio, assignor to General Motors Corporation, Detroit, Mich., a corporation of Delaware No Drawing. Application May 14, 1936, Serial No. 79,806

3 Claims. (Cl. 175—315)

This invention relates to the manufacture of electrolytic condensers comprising filmed metal electrodes associated with an electrolyte. In making such condensers, a ribbon of metal foil, generally aluminum foil, is passed through a bath of electrically conductive liquid or electrolyte while a direct current of electricity is passed through the liquid between the metal ribbon, as the anode, and a cathode of a suitable metal which will not be readily corroded by the bath. The surface of the ribbon becomes coated with a film which exhibits the property of a dielectric of molecular thickness.

One of the problems confronting manufacturers of electrolytic condensers is that of reducing the time required for filming the metal foil. Heretofore several factors have limited the speed of filming. First, the lack of means for conducting away from the filming tank the heat developed by using such amperages of electric current as would be required for filming at higher rates. Second, the lack of apparatus which is capable of passing the metal foil ribbon from a supply reel, through the filming tank and on to a take-up reel at higher speeds without tearing the ribbon. Third, the lack of cathode metal which is sufficiently corrosion-resistive to permit of practical use in the filming bath with relatively high amperages of electric current.

I have sought to remedy the first and second limitations by the apparatus described and claimed in my copending companion application Serial No. 79,805, filed May 14, 1936, which discloses means for circulating the electrolyte of the filming bath in proximity to a cooling coil or a cooling water jacket and apparatus capable of unwinding a ribbon of aluminum foil as thin as .0004 inch from a supply reel, passing it through the filming bath and winding it upon a take-up reel at the rate of 36 feet a minute and even as high as 45 feet a minute.

The aim and object of the present invention is to supply the need for a suitable cathode which will be capable of handling the amperages of electric current required for high speed filming without requiring frequent replacement and attendant loss of time due to "laying-up" the filming machine for renewal of the cathode.

I have discovered that a certain nickel alloy commercially known as "Inconel" is a material suitable for the cathode used in a bath for filming the metal foils of electrolytic condensers. "Inconel" has been used heretofore in the dairy industries as a metal suitable for containing milk. It is an alloy consisting approximately of 80% nickel, 14% chromium and 6% iron. A cathode made of "Inconel" will last many times longer than a cathode of aluminum heretofore used in a foil filming bath. In filming pure aluminum foil at 36 feet per minute, I prefer to use a filming voltage of 170 to 175 volts where the foil is to be used in making 110 volt electrolytic condensers, and a filming current of 110 to 112 amperes. I use a filming electrolyte comprising, by weight, boric acid 9.77%, sodium borate .23%, distilled water 90%. Under these conditions, I have used an "Inconel" cathode ⅛ inch thick for over a year, the average weekly time of service being about eighty hours. I find no perceptible deterioration of this cathode. Under these same conditions, an aluminum cathode would corrode so rapidly that its use would be impractical. I have found that about the limit of practical use of aluminum cathodes ⅜ inch thick is for filming at the rate of 18 feet per minute, the filming current being maintained between 61 and 62 amperes. Under these conditions the aluminum cathode lasts about 160 hours or two weeks of 80 working hours each.

I have tried filming at the rate of 45 feet per minute using an "Inconel" cathode and filming current at 170–175 volts and about 135 amperes and have found no perceptible corrosion of that cathode.

What I claim is as follows:

1. For use in filming aluminum foil for electrolytic condensers, a cathode comprising approximately 80% nickel, 14% chromium and 6% iron.

2. For use in filming aluminum foil for electrolytic condensers, a cathode comprising an alloy about 95% of which consists of nickel and chromium in the ratio of approximately 5.5 to 1, with the balance constituted of iron.

3. For use in coating an aluminum body with a dielectric layer of molecular thickness by electrolysis, a cathode comprising a nickel-chromium-iron alloy of which nickel and chromium together constitute about 95% of the whole, and are respectively related in the order of substantially 6 to 1.

GEORGE W. ELSEY.